United States Patent
Hodgson et al.

(10) Patent No.: US 7,668,855 B2
(45) Date of Patent: *Feb. 23, 2010

(54) METHOD AND APPARATUS FOR DEFINITION, REFERENCING AND NAVIGATION ACROSS MULTIPLE PERSPECTIVES OF AN ORGANIZATION

(75) Inventors: Simon Hodgson, York (GB); Dick Whittington, York (GB)

(73) Assignee: Salamander Enterprises Limited, Crowthorne, Berkshire (GB)

( * ) Notice: Subject to any disclaimer, the term of this patent is extended or adjusted under 35 U.S.C. 154(b) by 182 days.

This patent is subject to a terminal disclaimer.

(21) Appl. No.: 10/923,065

(22) Filed: Aug. 20, 2004

(65) Prior Publication Data

US 2005/0043984 A1 Feb. 24, 2005

(30) Foreign Application Priority Data

Aug. 22, 2003 (GB) ................................. 0319783.7

(51) Int. Cl.
*G06F 7/00* (2006.01)
(52) U.S. Cl. .................................... 707/102; 707/104.1
(58) Field of Classification Search ........... 707/1–104.1
See application file for complete search history.

(56) References Cited

U.S. PATENT DOCUMENTS

| | | | |
|---|---|---|---|
| 5,892,947 A | 4/1999 | DeLong et al. | 703/22 |
| 6,028,602 A | 2/2000 | Weidenfeller et al. | 345/781 |
| 6,097,887 A | 8/2000 | Hardikar et al. | 717/105 |
| 6,167,395 A | 12/2000 | Beck et al. | 707/3 |
| 6,173,297 B1 | 1/2001 | Moon et al. | 715/515 |
| 6,173,438 B1 | 1/2001 | Kodosky et al. | 717/105 |
| 6,192,314 B1 * | 2/2001 | Khavakh et al. | 701/209 |
| 6,199,193 B1 | 3/2001 | Oyagi et al. | 717/101 |

(Continued)

FOREIGN PATENT DOCUMENTS

EP 0749077 A2 12/1996

(Continued)

OTHER PUBLICATIONS

Charles Lane, "Methods for Transitioning from Soft Systems Methodology (SSM) Models to Object Oriented Ananalyis (OOA), developed to support the Army Operational Architecture (A0A)...", May 1998, Hi-Q Systems Ltd, section 1-8.*

(Continued)

*Primary Examiner*—James Trujillo
*Assistant Examiner*—Linh Black
(74) *Attorney, Agent, or Firm*—Head, Johnson & Kachigian

(57) ABSTRACT

The invention provides a method and apparatus for generating and subsequently using a series of graphical perspectives of an organization. Each of the perspectives includes a series of defined elements which are identified as being part of the perspective. Each element is analyzed in each of the perspectives and those which are common to more than one perspective are identified as are those elements which are interconnected and hence refer to each other. A graphical display panel is generated for each perspective which identifies in a dynamic manner those elements which are so connected and said panel can be used a navigational tool in conjunction with a graphical user interface.

16 Claims, 2 Drawing Sheets

U.S. PATENT DOCUMENTS

| | | | | |
|---|---|---|---|---|
| 6,219,055 | B1 | 4/2001 | Bhargava et al. | 345/420 |
| 6,385,724 | B1 | 5/2002 | Beckman et al. | 713/167 |
| 6,430,609 | B1 | 8/2002 | Dewhurst et al. | 709/220 |
| 6,442,557 | B1 | 8/2002 | Buteau et al. | 707/102 |
| 6,442,620 | B1 | 8/2002 | Thatte et al. | 719/316 |
| 6,539,379 | B1 * | 3/2003 | Vora et al. | 707/6 |
| 6,571,232 | B1 | 5/2003 | Goldberg et al. | 707/2 |
| 6,662,355 | B1 | 12/2003 | Caswell et al. | 717/103 |
| 6,718,366 | B2 | 4/2004 | Beck et al. | 709/204 |
| 6,745,382 | B1 | 6/2004 | Zothner | 717/107 |
| 6,774,911 | B2 | 8/2004 | Hodgson et al. | 345/619 |
| 6,813,587 | B2 | 11/2004 | McIntyre et al. | 702/183 |
| 6,874,119 | B2 | 3/2005 | Macleod et al. | 715/201 |
| 6,910,072 | B2 | 6/2005 | Macleod et al. | 715/500.1 |
| 6,983,321 | B2 | 1/2006 | Trinon et al. | 709/224 |
| 7,039,654 | B1 * | 5/2006 | Eder | 707/104.1 |
| 7,120,643 | B2 | 10/2006 | Dill | 707/102 |
| 7,162,427 | B1 | 1/2007 | Myrick et al. | 705/1 |
| 7,171,647 | B1 | 1/2007 | Smith et al. | 717/105 |
| 7,181,438 | B1 * | 2/2007 | Szabo | 707/2 |
| 7,219,327 | B1 | 5/2007 | Jacobs et al. | 717/104 |
| 7,225,249 | B1 * | 5/2007 | Barry et al. | 709/227 |
| 2001/0042063 | A1 | 11/2001 | Ebert | 345/854 |
| 2002/0032669 | A1 | 3/2002 | Smith et al. | 706/21 |
| 2002/0059264 | A1 | 5/2002 | Fleming et al. | 707/100 |
| 2002/0089550 | A1 | 7/2002 | Orbanes et al. | 345/853 |
| 2002/0198727 | A1 | 12/2002 | Ann et al. | 705/1 |
| 2002/0198791 | A1 * | 12/2002 | Perkowski | 705/26 |
| 2003/0126136 | A1 * | 7/2003 | Omoigui | 707/10 |
| 2004/0153378 | A1 * | 8/2004 | Perkowski | 705/27 |
| 2004/0243520 | A1 | 12/2004 | Bishop et al. | 705/75 |
| 2005/0021348 | A1 * | 1/2005 | Chan et al. | 705/1 |

FOREIGN PATENT DOCUMENTS

| | | |
|---|---|---|
| EP | 0883057 | 12/1998 |
| EP | 001271380 A2 * | 1/2003 |
| FR | 1271380 * | 2/2003 |
| WO | WO0102952 | 1/2001 |
| WO | WO0122331 | 3/2001 |

OTHER PUBLICATIONS

Lane Charles, "Methods for Transitioning from Soft Systems Methodology (SSM) Models to object oriented analysis (OOA), developed to support the Army Operational Architecture (AOA) and an Example of its Application.", United Kingdom, sections 1-8; 1999.*

"Powerful business transformation parnership enabling sustainable growth in e-business" http://web.archive.org/web/20000712093414/www.tsorg.com/pressrelease.thm.

Pyron, Tim, "Special Edition: Using Microsoft Project 98", Que Publishing, 1997, pp. 1033.

Salamander, "MooD Transformation Toolset Data Sheet", 2005.

Salamander Org. "MooD Transformation Toolset", www.mood.co.uk.2006.

Salamander, "Mood", http://web.archive.org/web/20001203010400/www.salamander-organzation.co.uk/mood.htm.2000.

Salamander, "Salamander", http://web.archive.org/web/20000303085028/http://www.tsorg.com/, 2000.

PC World, http://www.pcworld.com/downloads/file_description/0.fid, 6311,00.asp.

* cited by examiner

METHOD AND APPARATUS FOR DEFINITION, REFERENCING AND NAVIGATION ACROSS MULTIPLE PERSPECTIVES OF AN ORGANIZATION

CROSS-REFERENCE TO RELATED APPLICATIONS

This application claims priority to British Application No. 0319783.7 filed 22 Aug. 2003.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

This invention relates to a method and apparatus to express and deploy in a visual fashion the definition and referencing between alternative perspectives of an organization. The method and apparatus give a general way to describe, understand and explore an organization from multiple points of view that are held in synchronization. Although described with reference to implementation via apparatus in the form of a computer database, it should be appreciated that the method may be adapted to advantage in other ways.

Over recent years, organizations in many industries have recognized and registered benefits from the construction and communication of graphical visualizations of their structures and operations. Such benefits include improvements in the areas of change and performance management, and quality implementation.

However, the following needs are not addressed by current methods:

A need to be able to define multiple perspectives upon an organization, in a completely flexible and unlimited manner (e.g. geographic, organizational, technical, cultural, . . . ).

Within this, a need to be able to define references of general and unrestricted types between the elements of these perspectives (e.g. systems used by processes, people responsible for processes, people needed to be consulted by processes, . . . ).

A need to be able to understand, dynamically, the connexions of an element within a broader organizational graph, in terms of its dependencies with other elements, of the same or of different types.

A need to be able to use these visual connexions to navigate between elements within different perspectives (e.g. to navigate directly from a process to a system).

One form of prior art is the ability to establish connections between kinds of elements which is important in graphical design tools, and many of the current CASE Tools provide visual mechanisms for connecting specific perspectives (e.g. swimlanes). Such tools, however, fix the perspectives that are available together with the manner in which they are connected. Within this, John Zachman's "Framework for Enterprise Architecture" is the best example of a methodology that defines a finite set of defined perspectives.

A further form of known prior art is the class of general diagramming tools which allow completely flexible connectivity between elements. As such tools have no underlying schema, the meaning associated with a diagram is either added by annotation, or assumed to be expressed orally (i.e. as the diagram is presented).

A component approach to software construction is also known which has yielded valuable improvements in development and management of systems. Innovations originating from that work are various; see, for example EP0883057 "Method and apparatus for software component analysis" and WO0122331 "Method for defining an executable business model".

Related to this approach is the notion of autonomous intelligent software agents, which have been widely reported in recent years. A number of patents have emerged (e.g. WO0102952 "Improved Software Interface Agent"). Such inventions assert a component approach to software construction whereby components are able to perform "intelligently" through deployment of sophisticated analysis techniques including "learning".

A yet further known form of prior art includes graphical approaches to business development and transformation which increasingly play a significant part in business change programs. In a previous invention (British Patent Application No. 0112277.9 "Flexible and Direct Navigation"), a navigation mechanism has been described. In another (British patent Application No. 0118491.0 "Visual Synchronization"), a mechanism has been described to synchronize hierarchy and graphical views of an organization.

SUMMARY OF THE INVENTION

In a first aspect of the invention there is provided a method for the development of an organizational representation, said representation including a plurality of different perspectives of the organization, or part thereof, each perspective including a plurality of elements and wherein at least one of the elements is common to at least two of the perspectives.

In one embodiment, references between different elements of different perspectives are included in the representation.

In one embodiment, for each perspective, each element is assessed with respect to the possible dependencies on other elements in the same or other perspectives and where, identified a visual indication generated.

Typically a visual indication of the representation, perspectives, elements, and interrelations between the same is generated via a display monitor.

The present invention is based on the insight that a key requirement for business development is the ability to manage in a flexible way connections between diverse perspectives. Its innovation is in the way that it responds to this requirement in such a general and flexible way, together with the facility to use such connections as a navigation mechanism to move around and between perspectives.

Through the method, a graphical organizational model is created, using capabilities that are structured so as to describe the construction of an organization in terms of its diverse perspectives, each of which is defined in terms of component parts. The component parts of different perspectives might be defined in different terms, i.e. according to natural properties of the perspective. References between components are defined, such that an element within one perspective (e.g. a country) might refer to elements in another (e.g. plants situated in that country). Upon visual models, info panels list the referred elements in such a way that they can be navigated. The listed elements are updated dynamically in the event of change (e.g. as soon as a plant is moved to another country, the info panel against the country (i.e. plants situated) would update to show the change.

The invention therefore provides a method and apparatus for business development which allows effective and efficient navigation through various perspectives of an organization.

In one embodiment, the invention provides the user with the ability to define multiple perspectives upon an organization, in a completely flexible and unlimited manner (e.g. geographic, organizational, technical, cultural, . . . ) and, within this the ability to define references of general and unrestricted types between the elements of these perspectives (e.g. systems used by processes, people responsible for processes, people needed to be consulted by processes, . . . ), together with the ability to understand dynamically the connexions of an element within a broader organizational graph, in terms of its dependencies with other elements, of the same or of different types, and the ability to use these visual connexions to navigate between elements within different perspectives (e.g. to navigate directly from a process to a system).

The present invention describes a method and apparatus to deploy and utilize a graphical representation of an organization expressed in terms of multiple perspectives and their interactions, to support analysis, design, implementation and management.

A preferred embodiment contained herein shows the invention implemented as a graphical structuring and diagramming facility, together with a generalized definition facility, plus an "info panel™" — a mechanism for dynamic display and navigation, within a business development and transformation system using a graphical user-interface.

The present invention enables the flexible definition of arbitrary perspectives, which can be connected in user-defined ways. Furthermore, the present invention can automatically display current references and enable the user to navigate using these.

The present invention codifies connections between elements. This means that changes within one perspective can be automatically detected and displayed in another (e.g. removal of a system upon which processes are dependent).

BRIEF DESCRIPTION OF THE DRAWINGS

A specific embodiment of the invention is now described with reference to the accompanying drawings, wherein.

DETAILED DESCRIPTION OF THE PREFERRED EMBODIMENTS

Figure 1:
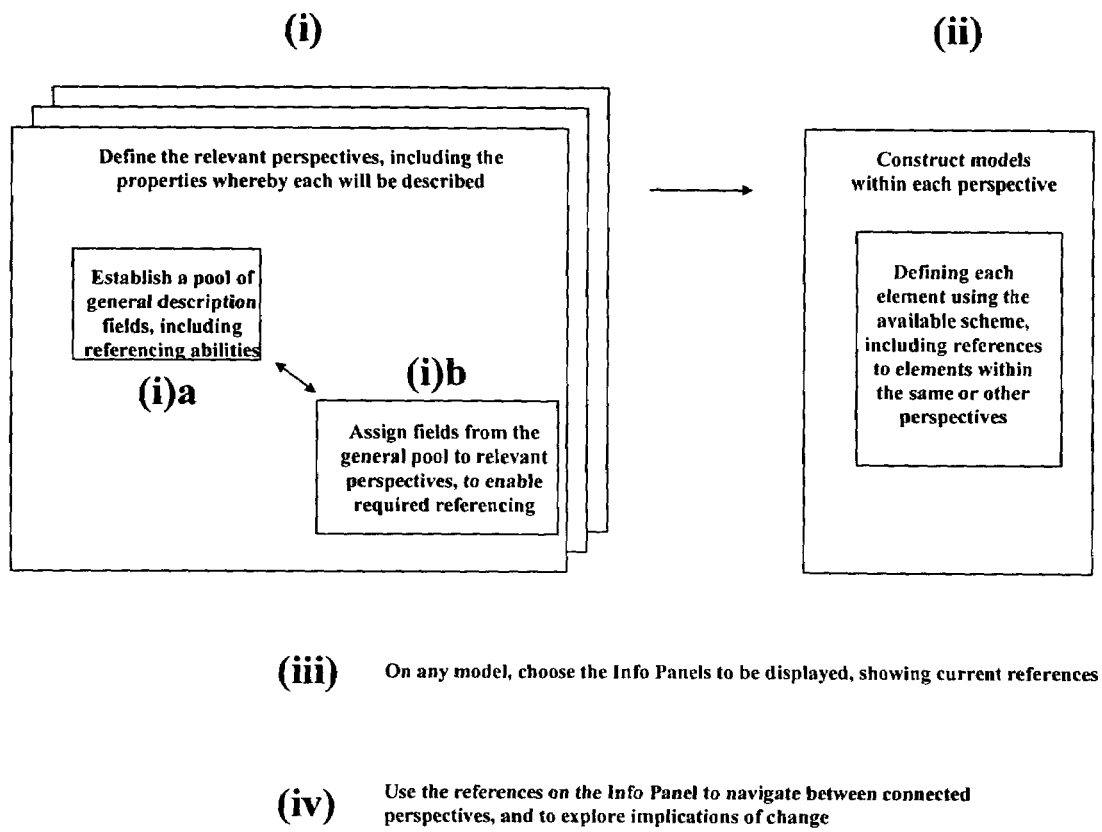
FIG. 1 illustrates a schematic representation of the current invention in one embodiment.

Referring to FIG. 1 there is shown a schematic representation of the invention in which the following method steps are followed:

i. Define the relevant perspectives or views of the organization, including the set of properties by which elements within these different perspectives will be defined.

(a) Establish a general pool of elements or fields.

(b) Assign elements or fields to the appropriate perspectives ii. Construct a graphical model within and for each defined perspective.

Analyze the elements defined within each perspective and where applicable generate references to other elements within the same or different perspectives such that these references will be viewable by a user.

iii. For each or any model within any or all of the perspectives select the information panels to be generated which show the elements for each perspective and which show the current state of references between elements in that and other perspectives at any given time of use, said information panels changing in condition in response to any changes which are made to the elements within the representation.

iv. Use these references and hence the elements to navigate around graphical representations of the organization within and between perspectives in a connected way using a graphical user interface tool.

Typically the above steps are utilized in conjunction with suitable software and at least one display screen on which the graphical representations can be generated and with which the user can interact.

In one embodiment, the apparatus deployed can include a business development and transformation tool. A software system is provided having a graphical user interface for the definition and manipulation of the elements and structures described in the method. Further included are general mechanisms for definition of perspectives, properties, referencing, display and navigation. Within the software system there is a mechanism that supports automatic display of current reference values.

The functionality of the "information panel" mechanism provides a powerful user experience of information and navigation, which delivers the ability for an organization to understand, communicate and analyze its complexity and potential to change.

In one preferred embodiment, graphical models are used to define and communicate best practice within an organization, with the potential benefit of enhanced business performance and the reduction in risk of failures of adherence to best practise, whether that best practise is defined within the organization or by a regulatory body.

Within such models that describe best practice, a very large number of elements in the form of personnel capabilities typically inter-relate in a complex manner. The ability to maintain a contextual view of these capabilities is important to developing and communicating a sound understanding of how the organization is structured, and to describing how it operates at various levels of abstraction. Consequently, a combination of synchronized views or perspectives of the organization is an important contribution to successful organization development.

The invention described in this patent can be used as a central resource within an organizational development and change management methodology and toolset. Through the method, an arbitrary number of perspectives of an organization may be created. For example, one may describe it in terms of its operational processes, another in terms of its underlying systems architecture, and another in terms of its organizational accountabilities and reporting. With this method and apparatus each of these perspectives can be defined uniquely and described in a manner that is natural for that perspective. References between perspectives can be defined in a flexible, bi-directional manner with reference to the elements which are designated to each perspective.

Figure 2:
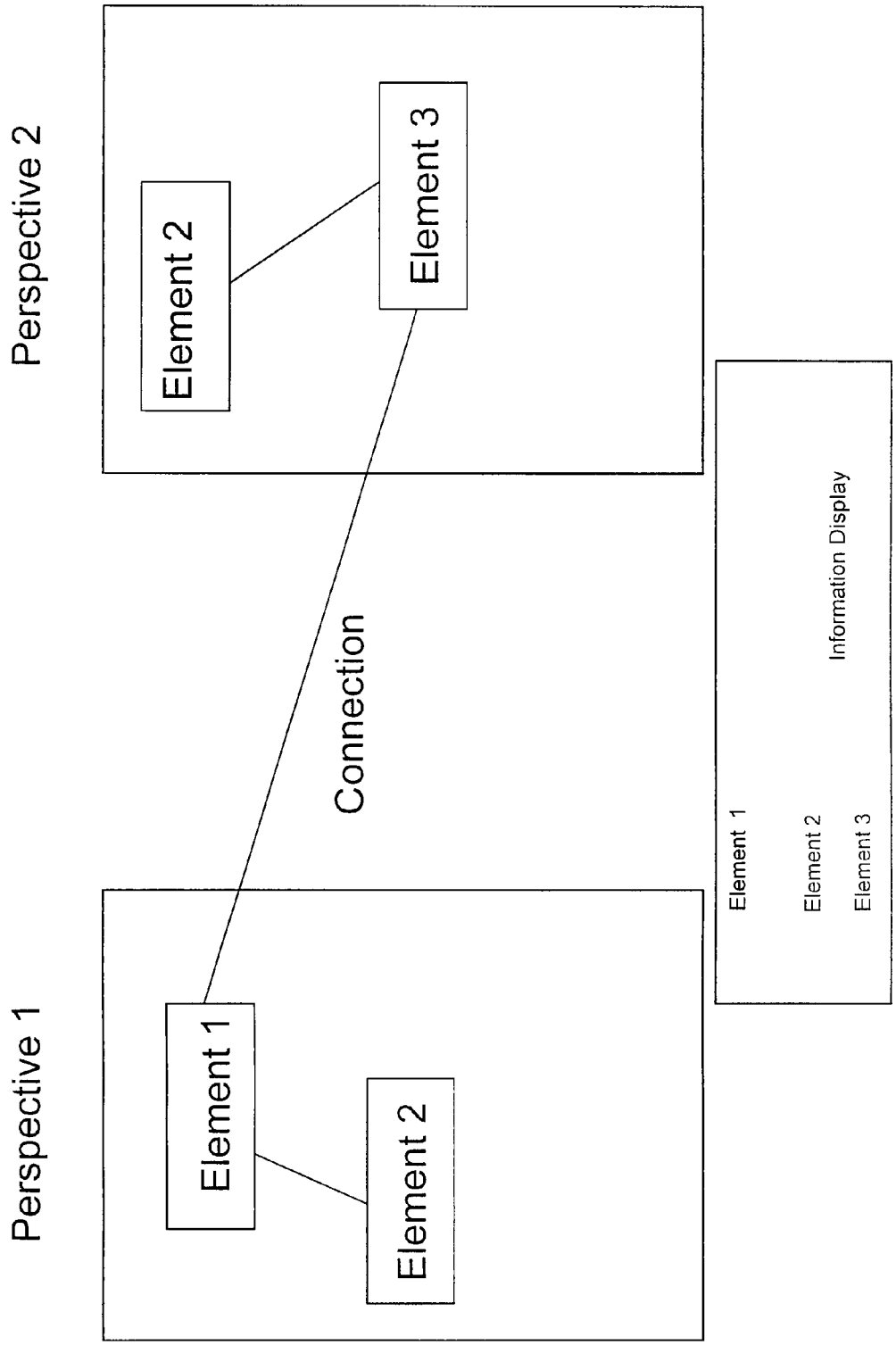
FIG. 2 is a block diagram of the current invention.

As seen in FIG. 2, the dependencies within and between elements in the perspectives are visually and dynamically available via a graphical representation to a user of the method. Furthermore, linkages within and between perspectives can be exploited for the purposes of navigating through the overall model.

The current invention differs from the prior art software component management systems in that, the components represent more general business (and not necessarily software) capabilities. Secondly, the capabilities are not intended for execution as occurrences within a software system, but are intended for analysis and communication purposes by organization designers and quality managers. This does not preclude the use of one of the capabilities as a design for a software component. Thirdly, and following from the second, the structuring and navigation mechanisms offer functions not required, and so not provided, by such other methods; e.g. automatic navigation between alternative views.

The current invention builds upon both of these inventions by permitting wider definition of alternative perspectives, referencing and navigating between these via Info Panels, thus increasing the power and effectiveness of the approach.

While the invention has been described with a certain degree of particularly, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claim, including the full range of equivalency to which each element.

The invention claimed is:

1. A method for the development of a visual organizational representation, said method comprising the steps of:
defining a plurality of different perspectives of the same organization, or part thereof, each perspective including a plurality of elements and wherein at least one of the elements is common to at least two of the perspectives; and
generating for each of the perspectives a visual indication in the form of a graphical organizational model, each graphical organizational model showing the elements and interrelations between the same for that perspective and wherein the visual indication further includes, for each graphical organization model, a graphical information display panel in which those elements of the displayed organization model which are included in graphical organizational models for other perspectives of the organization are displayed and by selecting an element in the graphical information display panel the user can select to navigate to another of the said perspectives in which the selected element is included and cause the display of that graphical organizational model for the user selected other perspective, wherein the graphical information display panel changes dynamically depending on the status of the graphical organizational models at that time and automatically displays the current elements which appear in said models for other perspectives so as to allow user navigation to the other graphical organizational models for other perspectives which contain the selected elements at the time.

2. The method according to claim 1 wherein references between different elements of different perspectives are included in the representation.

3. The method according to claim 1 wherein for each perspective each element is assessed with respect to a possible dependencies on other elements within a same perspective or other perspectives.

4. The method according to claim 3 wherein if a dependency is identified a visual indication is generated.

5. The method according to claim 1 wherein elements which appear in two or more of the perspectives are indicated visually in each perspective in which the said element appears.

6. The method according to claim 1 wherein connections between elements in different perspectives are visually indicated.

7. The method according to claim 1 wherein a graphical organizational representation model is created, using capabilities that are structured so as to describe the construction of an organization in terms of its diverse perspectives, each of which is defined in terms of elements thereof.

8. The method according to claim 7 wherein the elements of different perspectives are defined using selected terms.

9. The method according to claim 8 wherein the selected terms are properties of the perspective and references between elements are defined, such that an element within one perspective refers to an element in another perspective.

10. The method according to claim 1 wherein a visual representation includes an information display which lists the referred elements in such a way that they can be navigated.

11. The method according to claim 10 wherein the listed elements are updated dynamically in the event of change to that element or an element which is referred to.

12. The method according to claim 1 wherein the user has the ability to define multiple perspectives of an organization with reference to elements of each of said perspectives.

13. The method according to claim 12 wherein references are generated of general and unrestricted types between the elements in the perspectives and connections of each element within the organization are defined in terms of the elements dependencies with other elements, of the same or of different types.

14. The method according to claim 13 wherein the connections are used to navigate between elements within different perspectives.

15. The method according to claim 1 wherein the representation is generated as a graphical structuring and diagramming facility, together with a generalized definition facility, and includes a mechanism for dynamic display and navigation using a graphical user-interface.

16. A method for generating and subsequently using a series of graphical organization models of perspectives of an organization, said method comprises the following steps:
each perspective including a series of defined elements which are identified as being part of the perspective;
each element analyzed in each of the perspectives and those elements common to more than one perspective are identified, as are those elements which are interconnected and hence refer to each other; and
wherein a graphical information display panel is generated for each perspective which identifies in a dynamic manner those elements in the perspective which also appear in a further perspective and said graphical information display panel is used as a navigational tool in conjunction with a graphical user interface to allow user navigation between each of the graphical organizational models for the differing perspective displays by selection of an element from said graphical information display panel for the perspective to cause the generation and display of a further graphical organizational model for a further perspective of the organization and in which further perspective the selected element is also included, wherein the graphical information display panel changes dynamically depending on the status of the graphical organizational models at that time and automatically displays the current elements which appear in said models so as to allow navigation to the other graphical organizational models for other perspectives which contain the selected element at that time.

* * * * *

UNITED STATES PATENT AND TRADEMARK OFFICE
CERTIFICATE OF CORRECTION

PATENT NO. : 7,668,855 B2
APPLICATION NO. : 10/923065
DATED : February 23, 2010
INVENTOR(S) : Hodgson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 631 days.

Signed and Sealed this

Seventh Day of December, 2010

David J. Kappos
*Director of the United States Patent and Trademark Office*